(12) United States Patent
Ohmayer

(10) Patent No.: US 7,131,326 B2
(45) Date of Patent: Nov. 7, 2006

(54) LEVEL METER, OSCILLATING BODIES, AND EQUALIZING BODY FOR A LEVEL METER, AS WELL AS A DRIVE AND/OR RECEIVING DEVICE FOR THE SAME

(75) Inventor: Gerd Ohmayer, Haslach (DE)

(73) Assignee: Vega Grieshaber KG, Wolfach (DE)

( * ) Notice: Subject to any disclaimer, the term of this patent is extended or adjusted under 35 U.S.C. 154(b) by 98 days.

(21) Appl. No.: 11/033,863

(22) Filed: Jan. 13, 2005

(65) Prior Publication Data
US 2006/0021430 A1    Feb. 2, 2006

(30) Foreign Application Priority Data
Feb. 27, 2004    (DE) ...................... 10 2004 009 495

(51) Int. Cl.
*G01F 23/00*    (2006.01)
(52) U.S. Cl. .................................. 73/290 V; 73/290 R
(58) Field of Classification Search .............. 73/290 V, 73/290 R
See application file for complete search history.

(56) References Cited

U.S. PATENT DOCUMENTS

| | | | |
|---|---|---|---|
| 4,740,726 A * | 4/1988 | Umezawa .............. | 310/316.01 |
| 4,896,536 A | 1/1990 | Benz | |
| 5,247,832 A * | 9/1993 | Umezawa et al. ......... | 73/290 V |
| 5,524,486 A * | 6/1996 | Hermann ................ | 73/290 V |
| 6,205,855 B1 * | 3/2001 | Pfeiffer .................... | 73/290 V |

FOREIGN PATENT DOCUMENTS

| | | |
|---|---|---|
| DE | 34 16 254 C2 | 11/1985 |
| DE | 37 40 598 C2 | 6/1989 |
| DE | 38 08 481 C2 | 9/1989 |
| DE | 42 03 715 C2 | 8/1993 |
| DE | 196 51 362 C1 | 6/1998 |
| DE | 101 31 081 A1 | 1/2003 |
| DE | 103 18 705 A1 | 11/2004 |
| DE | 103 21 025 A1 | 12/2004 |
| EP | 0 949 489 A1 | 10/1999 |

* cited by examiner

*Primary Examiner*—Hezron Williams
*Assistant Examiner*—Rodney Frank
(74) *Attorney, Agent, or Firm*—Nath & Associates PLLC; Gary M. Nath; Gregory B. Kang

(57) ABSTRACT

The invention relates to a level meter with two oscillating bodies (2, 3) positioned one inside the other. An equalizing body (5) is positioned in the interior (32) of the inside oscillating body (2). The equalizing body (5) exhibits a section (52) that is at least in part elastic, such that the outer diameter (ds*) of the elastic section in relaxed condition is greater than the inner diameter (dgi) of the interior (32). This provides a good coupling and, at the same time, protection against displacement for the equalizing body (5) relative to the inside oscillating body (3). For supplemental adjustment of the equalizing body (5), the latter is provided with an outside thread (51), which engages with an inside thread (33) belonging to the interior (32). A slot (52) for adjusting the equalizing body (5) is accessible via an access opening (6); the access hole (6) runs in the rearward direction, through the individual components of the level meter (1), including the drive and/or receiving device (7).

15 Claims, 2 Drawing Sheets

Figure 2:
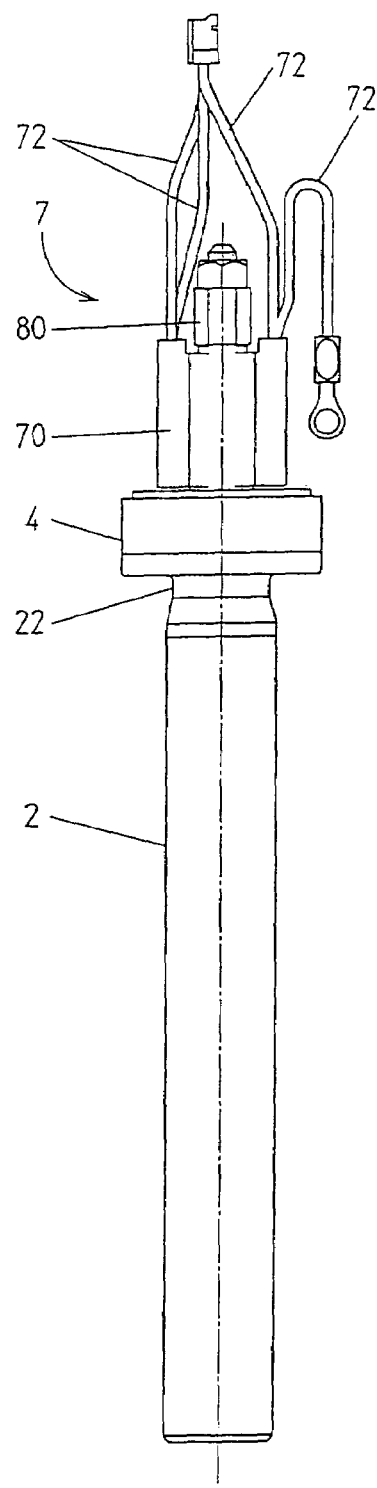

LEVEL METER, OSCILLATING BODIES, AND EQUALIZING BODY FOR A LEVEL METER, AS WELL AS A DRIVE AND/OR RECEIVING DEVICE FOR THE SAME

The device relates to an oscillating body for a level meter exhibiting the features of the preamble of claim 1, to an equalizing body for this kind of oscillating body, to a drive and/or receiving device for the oscillating body and exhibiting the features of the preamble of claim 9, and to a level meter exhibiting the features of the preamble of claim 14.

A level meter for monitoring a predetermined filling level in a container is known from DE 196 51 362 C1. This level meter exhibits a mechanical oscillating system consisting of two oscillating bars, one of which is tube-shaped in form and which coaxially encompasses the other bar. Each of the two oscillating bars is attached to a common support by an elastic holder that acts as a reset spring, in such a way that the bar executes oscillations perpendicular to its longitudinal direction. A drive arrangement sets the two oscillating bars into transversal vibration in opposite directions; the vibrations have the self-resonant frequency of the mechanical system. A sensor designed in this way is mounted on the container in such a way that the tubular outer oscillating bar comes into contact with the filling material when it reaches a given level. A receiving device serves to register the oscillations. An evaluating circuit will trigger display or switching events as a function of the oscillating amplitude of the mechanical oscillating system.

To compensate for a change in the self-resonant frequency of the oscillation pattern formed by the outer oscillating bar and its elastic holder when a deposit has formed on the outside oscillating bar, a compensatory mass acting as an equalizing body is movably positioned on the inner oscillating bar, in the latter's longitudinal direction. By moving the compensatory mass the natural frequency of the oscillating pattern formed by the inner oscillating bar and its elastic holder can be adjusted to the natural frequency of the external oscillating pattern.

To receive and guide the compensating body the front section of the inner oscillating bar, i.e., the section directed into the container, is tubular in shape. The compensating body has a corresponding outer circumference, so that it can be positioned inside the tubular section of the inner oscillating bar. To adjust the equalizing body a rod is provided which leads through a central through-hole along the longitudinal axis of the inner oscillating bar and through its back to an adjusting element, which is positioned in the outside area of the support. The adjusting element is controlled by signals emitted by an excitation and evaluation circuit. One disadvantage, among others, in this kind of configuration is the central position of the adjusting element and the rod that runs along the longitudinal axis and is used for positioning the equalizing body—since, as a result, the drive and receiving device must be positioned as structurally separate units in the lateral area of the support, or the area of the elastic transitional zone between the support and the outer oscillating bar. Apart from the structural expense, this results in non-uniform oscillations, particularly when the drive and receiving devices are not exactly positioned.

The goal of the invention is to improve this kind of level meter by providing a simple structural design, an improved oscillation behavior with respect to drive and reception, and an equalizing body that is more easily adjusted.

This goal is achieved by an oscillating body for a level meter exhibiting the features of patent claim 1, an equalizing body exhibiting the features of patent claim 7, a drive and/or receiving device for this kind of arrangement exhibiting the features of claim 9, and a level meter exhibiting the features of claim 14. In addition to these individual devices and their advantageous application, a particularly advantageous design emerges with the combination, since taken together they provide a particularly advantageous and mutually enhancing design.

Of particular advantage, therefore, is an inner oscillating body for a lever meter such that the inner oscillating body exhibits, at least in part, an interior in which an equalizing body can be adjustably positioned when said equalizing body has an elastic section whose outer diameter is greater than the inner diameter of the interior when the elastic section is in relaxed condition. Given these dimensions, the elastic section and the entire adjusting body are held in the desired position within the interior. The elasticity parameters of the equalizing body determine the strength of the connection. The connecting strength can be suitably established, both with respect to the force needed to adjust the equalizing body within the interior, and to an independent adjustment capability represented by shaking, and the like.

In this kind of oscillating body the equalizing body itself is of independent advantage. Also of independent advantage is a drive and/or receiving device which can be specifically employed in conjunction with the inside oscillating body, or a corresponding level meter, when the drive and/or receiving device generates or receives the oscillations of at least one oscillating body and exhibits an oscillation transmitting section designed to transmit an oscillation between an oscillating body and the drive and/or receiving device; and such that the drive and/or receiving device, the oscillation transmitting section, and the one or more oscillating bodies extend along the longitudinal axis of the apparatus during operation. The drive and/or receiving device is advantageously designed to provide an access opening, or through-hole, in a direction along or parallel to the longitudinal axis of the device, leading through the drive and/or receiving device, and through the oscillation transmitting section, to the one or more oscillating bodies. This arrangement thus provides access to the oscillating body starting from the back of the device and running through the drive and/or receiving device. A symmetrical arrangement for the drive and/or receiving device, around and through the central longitudinal axis of the entire apparatus, is nonetheless possible from the back of a level meter, so that manipulation of the oscillating body is possible from the back when the apparatus is in installed and functioning condition. In particular, it is possible to access an equalizing body inside the oscillating body for the purpose of regulating said oscillating body.

Of particular advantage, therefore, is a level meter with two oscillating bodies, one positioned inside the other, which bodies can be made to oscillate relative to each other; and with a drive and/or receiving device for exciting at least one of the oscillating bodies or for detecting an oscillation or excitation on the part of at least one of the oscillating bodies; and with a fastening device for securing the oscillating bodies to the drive and/or receiving device, such that the outside oscillating body is secured to the fastening device by means of a connecting section which, at least in part, has an elastic effect. An advantageous feature here rests in the fact that the fastening device exhibits a through-hole for introducing a connecting element, such that the connecting element is secured to the fastening section and runs through the through-hole to the fastening device and by means of the latter braces the drive and/or receiving device against the connecting section at the back. Also of advantage is the fact that the connecting element is guided through the through-hole of the fastening device without friction and in such a way that oscillation of a rear section of the drive and/or receiving device is transmitted to the connecting section and/or the outside oscillating body by the connecting element of the fastening device.

Advantageous embodiments are the subject matter of dependent claims.

The equalizing body advantageously exhibits a cut or slot, serving as an elasticity slot, for compressing the elastic section such that its outer diameter is smaller than or equal to the inner diameter of the interior of the inside oscillating body. This kind of slot, which will ideally be frontally positioned, makes it possible to compress a section otherwise too wide in the given area, so that it is possible to reduce the circumference of the section of the equalizing body (which section otherwise has too large an outer diameter) to an outer diameter that is smaller than or equal to the inner diameter of the inside oscillating body. This slot, or another slot on the opposite, rear side of the equalizing body is advantageously designed for the purpose of adjusting the position of the equalizing body. Here the equalizing body is provided with an outer thread, and the interior of the oscillating body is provided with a matching inner thread, so that the equalizing body can be adjusted within the interior by a screwing action. Adjustment of the equalizing body is possible with the help of a screwdriver or a comparable, motor-driven adjusting device, which can be applied from the back of the level meter and through the through-hole, even when the apparatus is in assembled condition.

The access hole in the oscillating body is thus designed in such a way that it leads to the equalizing body for the purpose of adjusting said equalizing body. In principle, the access hole can be formed from the front, such that it is only possible to adjust the equalizing body from the inside of the container, when the level meter is installed; or otherwise, only after it is disassembled. Preferred is an access hole operating from the back, such that the equalizing body can be adjusted from the rear, or the outside, even when the level meter is in installed condition. Particularly advantageous is a design in which the access hole runs through the drive and/or receiving device, thereby allowing the latter to be symmetrically positioned around the longitudinal axis of the entire configuration.

The drive and/or receiving device is particularly advantageous when the access hole is designed as an access hole to an equalizing body such that the equalizing body is movably positioned inside the one or more oscillating bodies in order to equalize the oscillating body. As a result, it is possible, e.g., to equalize the oscillating behavior of the inside oscillating body and adjust it to the changed oscillating behavior of the outside oscillating body when there is material adhering to the outside of the first oscillating body.

Here is advantageous if the actual drive and/or receiving device, i.e., the structural unit containing the oscillating or sensor elements, is symmetrically designed around the access hole. The access hole will advantageously take the form of a central borehole such that the shaft of a screwdriver can be inserted into it in a simple fashion.

The drive and receiving device will ideally be outfitted with a fastening device for securing the drive and reception to a fastening element belonging to the oscillating body, specifically in an area to the side of the actual drive and/or receiving device. With this kind of arrangement the actual drive and/or receiving device, including the oscillating or sensor elements, will be encompassed laterally and will be evenly pressed against the fastening device by the application of force from the back. This makes possible a particularly uniform and axiometric feed of oscillations from the drive device into the area of the one or more oscillating bodies—or a comparably uniform return of oscillations from the oscillating body to the components of the receiving device.

With this kind of arrangement the oscillating rod can be advantageously equalized without the need to mechanically twist off the oscillating membrane. As compared to an arrangement with an adjusting member at the back—which prevents the central transmission of oscillations—an access hole that runs all the way through enables the axiometric transmission of oscillations. This kind of configuration can also be operated at high temperatures, e.g., 250° C., and this is an advantage. Minimal wall thicknesses for the oscillating membrane, i.e., the elastic section between the fastening device and the specific oscillating body, are also possible, even for dimensions equal to or larger than 1 mm.

Figure 1:
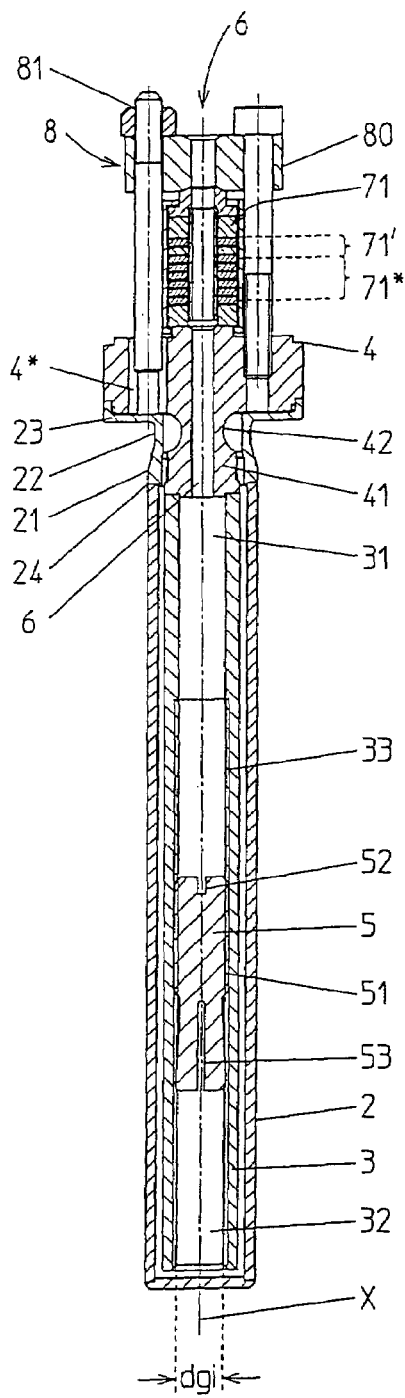
Figure 3:
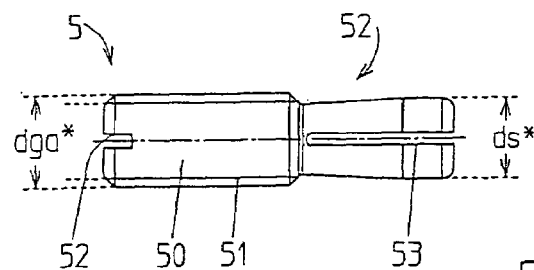
Figure 4:
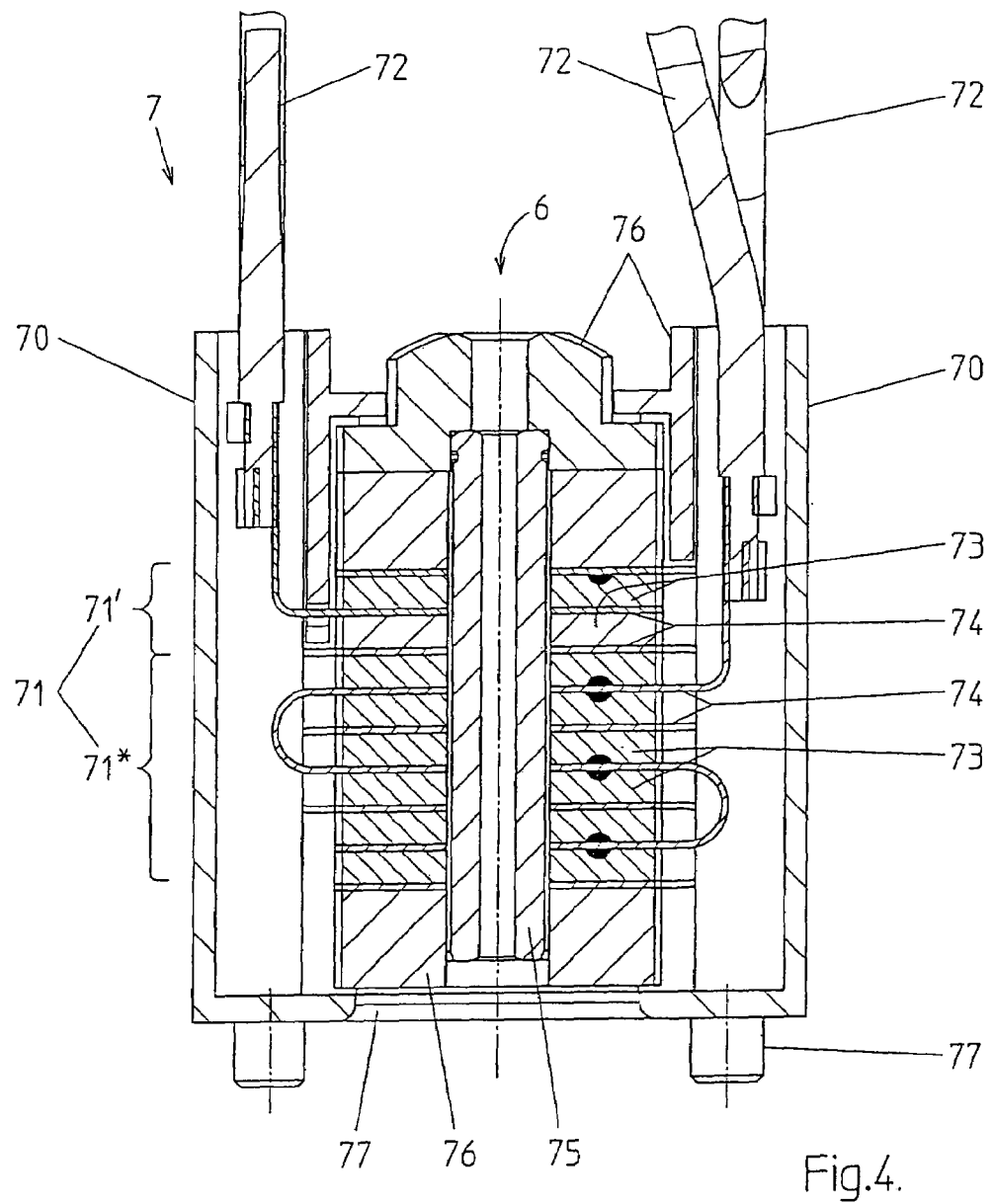

An exemplary embodiment will next be described in greater detail on the basis of the drawing. Shown are:

FIG. 1 a sectional view through a level meter with an adjustable equalizing body and a drive and/or receiving device symmetrically positioned around the longitudinal axis FIG. 2 an external view of the level meter FIG. 3 the equalizing body enlarged FIG. 4 a sectional depiction through the drive and/or receiving device.

As can be seen from FIG. 1, an exemplary level meter 1 consists of oscillating bodies 2, 3, which are driven by a drive and/or receiving device. The depicted exemplary embodiment deals with a combined drive and/or receiving device.

The two oscillating bodies 2, 3 are connected by a fastening device 4. The fastening device 4 also serves as a support or pedestal for attaching the level meter 1 in a housing hole belonging to the container whose level of fill is being monitored. The depicted arrangement is basically designed in cylindrically symmetrical fashion around a central longitudinal axis X. Cross-sections other than a circular one are possible in principle, however. In the following, front elements are understood to be those which extend toward the interior of the container, and rear elements are understood to be those which extend toward the outside of the container.

The two oscillating bodies 2, 3 comprise an outside oscillating body 2 and an inside oscillating body 3, both of which are basically tubular in shape. The rear section 31 of the inside oscillating body 3 can have a reduced inner diameter relative to the interior 32, up to a through-hole running longitudinally; the interior 32 is bordered by the inner wall of the inside oscillating body 3. Depending on the application, the two oscillating bodies 2, 3 can be opened or closed on the front side.

The outside oscillating body 2 is fastened to the fastening device by a rear connecting section. The rear connecting section consists of a cylindrical section 21, which runs in the axial direction from the back end of the outside oscillating body 2 and will ideally form an elastic section by means of a tapered or contracted segment. The cylindrical section 21 will ideally be connected to the outside oscillating body 2 by means of a welded seam 24. In the depicted exemplary embodiment the contracted area 22 passes into a connecting segment 23 running perpendicular to the longitudinal axis X; this connecting segment 23 assumes the function of a membrane, ideally in conjunction with the contracted segment 22. The outside segment of the connecting segment 23 is attached to the fastening device 4 by means of, e.g., a welding. With this arrangement the outside oscillating body 2 can be set into vibration relative to the fastening device 4; in the process, the membrane exerts a restoring force on the outside oscillating body 2, so that the oscillations attenuate over time.

The inside oscillating body 3 is connected at the back to a section 41 of the fastening device 4, particularly by means of a welding. The segment 41 of the fastening device 4 projects from the main body of the fastening device 4 into the space which is formed by the cylindrical segment 21 for attaching the outside oscillating body 2. The section 41 of the fastening device 4 also has a contracted area 42, such that with an appropriate selection of material the segment 41 of the fastening device 4, in conjunction with the contracted area 42, acts as an elastic section serving as a membrane for the inside oscillating body 3. The inside oscillating body 3 can be set into vibration, on the one hand; on the other hand, the attachment provided by the fastening device 4 and the section 41, together with the contracted area 42, cause a restoring force to be exerted on the inside oscillating body 3 while it vibrates, so that its oscillations attenuate over time.

An equalizing body 5 is inserted into the open interior 32 of the inside oscillating body 3. The equalizing body 5 is adjustably positioned within the interior 32, in the direction of the central longitudinal axis X, so that by regulating the equalizing body 5 the oscillating behavior of the inside oscillating body 3 can be adjusted to the oscillating behavior of the outside oscillating body 2. In addition to this adjustment of the oscillating behavior of the inside oscillating body 3 to the oscillating behavior of the outside oscillating body 2 in the basic operating state, a modified adjustment is also possible when the oscillating behavior of one of the oscillating bodies 2, 3, particularly the outside oscillating body 2, changes over time, for example due to adherent material.

As can be seen in FIG. 3, the preferred oscillating body [sic] 5 consists of a main body section 50, which exhibits an outer thread 51 on the outside. The outer thread 51 is coordinated with an inner thread 33, which is formed on the inside wall of the interior 32 of the inside oscillating body 3. As a result the equalizing body 5 can be positioned in the interior 32 by its being screwed in the forward or backward direction. This adjustment process is assisted by a cut 52, which is formed in a frontal area of the equalizing body 5. The access to the cut 52 is provided by a through-hole or access hole 6, which runs from the back through the different sections and components of the level meter 1 to the interior 32. The equalizing body can be manually adjusted with a screwdriver via the access hole 6. Naturally it is also possible to introduce an appropriate adjusting instrument with a motorized control system, for example, in the automated final adjustment of the complete and fully functioning sensor.

The equalizing body 5 also exhibits an elastic section 52. In its relaxed state the elastic section 52 has an outer diameter ds*, at least in one portion, which is larger than the inner diameter dgi of the cavity 32. In order to introduce the elastic section into the cavity 32, the elastic section 52 must therefore be compressed to an outer diameter equal to or smaller than the inner diameter dgi of the cavity 32. For this reason an elasticity slot 53 is built into the elastic section 52. The elasticity slot 53 runs along the elastic section 52. The width of the elasticity slot 53 is such that the outer circumference of the elastic section 52 can be compressed to the necessary degree. Thus the outer diameter ds* of the elastic section 52 in relaxed state is also greater than the outer circumference dga* of the outer thread 51 of the main body section 50 of the equalizing body 5.

In order to introduce the equalizing body 5 into the cavity 32 in a simple fashion, it can be inserted into the cavity 32 from an open side of the inside oscillating body 3. As soon as the section that is wider than the inner diameter dgi of the cavity 32 passes into the interior 32, the section will be compressed due to its tapered design; however, it also exerts a bracing force against the inner wall of the cavity 32, with the result that the equalizing body 5 will be braced into position within the inside oscillating body 3. Consequently, an automatic displacement, as caused by oscillating motions of the inside oscillating body 3, cannot occur.

Preferred is an equalizing body 5 in which the transitional area between the main body section 50 and the elastic section 52 tapers to a width less than the thread depth of the outer thread 51, but such that the elastic section enlarges conically from this point onward.

At the back a drive and/or receiving device 7 is secured to the fastening device 4. The drive and/or receiving device 7 basically consists of a housing 70 for receiving the actual drive/or receiving device 71 and to receive various fastening elements and connection cables 72. The actual drive and/or receiving device in the depicted exemplary embodiment is formed by a drive unit 71* at the back and a receiving unit 71 at the front. Running centrally along the longitudinal axis X, through the drive and/or receiving device 7 as well as through all the components positioned in this area, is the through-hole or access hole 6, which provides central access through the drive and/or receiving device 7 to the fastening device 6 or to the cavity 32 of the inside oscillating body 3.

The actual drive and/or receiving device 71 consists of a plurality of drive and/or reception elements 73 positioned one above the other in layered fashion, particularly piezo-elements, between which electrodes 74 are positioned. The electrodes 74 are connected to corresponding connection cables 72 used to apply voltages in the production of an oscillation and to remove voltages which have been produced by a received oscillation. To avoid damage and increase support, as well as to avoid short circuits, a bushing 75 consisting of an electrically insulating material runs centrally through the drive and/or receiving device 7. The individual piezo-elements 73 and electrodes 74, as well as the bushing 75, are clamped between fastening elements, i.e., elements belonging to a clamping device 76, in such a way that the front-side transmission of oscillations from or to the fastening device 4 and the oscillating bodies 2, 3 is possible. To facilitate the arrest and improve the transmission of oscillations, auxiliary elements 77 are formed on the front of the housing 70 in the form of pins and recesses, which engage with mating elements on the facing rear wall of the fastening device 4.

To fasten the drive and/or receiving device 7 to the fastening device 4 a gripping mechanism will ideally serve as a fastening device 8. This will ideally consist of a fastening element 80, which runs perpendicular to the longitudinal direction and which also has a central through-hole 6, such that said fastening element 80 is mounted at the back across and above the drive and/or receiving device 7. The gripping process is executed in a known manner, e.g., with an arrangement consisting of screws, threaded bolts, and nuts 81.

To transmit oscillations from the membrane 23 of the outside oscillating body 2 to the back of the drive and/or receiving device 7, or to the latter's rear fastening element 80, at least one connecting element 81 will ideally be fastened to the back wall of the membrane 23, such that this connecting element 81 runs through the corresponding through-hole 4\* in the fastening device, preferably in a friction-free manner. This connecting element 81 runs along side the drive and/or receiving device 7 in the rearwards direction, up to the fastening element 80 extending crosswise, with the result that an oscillation of the membrane 23 will be transmitted by this connecting element 81 and by the rear fastening element 80 to the back of the drive and/or receiving device 7.

In this way the fastening element 80 is braced against the fastening device 4 by a connecting element 81, and particularly against the connecting section 22, 23, of the outside oscillating body 2, and because of the bracing feature the oscillations of the outside oscillating body 2 will be transmitted at the back toward the drive and/or receiving device 7.

The wedging or bracing of the equalizing body 5 provides a good coupling for the oscillating rod or the inner oscillating body 3. In this way it is possible to successfully equalize the entire oscillating system, since an unstably seated equalizing body would dampen the entire system. The mass of the equalizing body will ideally be regulated in such a way that, given 100% accuracy to size of the components, the equalizing body will be positioned in the center of the open interior 32, with the result that the oscillating system can be equalized by adjustment in the forward or rearward direction. Additional protection against twisting is not necessary due to the clamping effect of the screw.

In principle, any desired material can be used for the equalizing body; metal provides the advantage of being heat-resistant, in addition to having a relative high mass. An advantage is conferred in that it is unnecessary to use plastic clamping layers, which are not heat-resistant. Mechanical removal of material on the oscillating membrane for the purpose of equalization is no longer called for.

The central through-hole or access hole 6 permits a central design for the entire system, and equalization by adjustment of the equalizing body 5 from the back of the level meter is possible even when the device is in assembled condition. Another advantage rests in the fact that only a single drive is necessary, one which is positioned concentrically around the central axis of the entire system and advantageously allows for the transmission of oscillations to or from the oscillating bodies 2, 3 via an oscillation transmitting section. The oscillation transmitting section 4 specifically consists of the fastening device 4 and, if so desired, other fastening and intermediate elements belonging to the drive and receiving device 7. Equalization is consequently simple and possible at any time, without the need to disassemble the rear structural components.

The invention claimed is:

1. An inside oscillating body (3) for a level meter (1), with an interior (32) in which an equalizing body (5) is adjustably positioned, wherein the equalizing body (5) exhibits a section (52) that is at least partially elastic, such that the outer diameter (ds\*) of the elastic section (52) in relaxed condition is larger than the inner diameter (dgi) of the interior (32).

2. An oscillating body according to claim 1, in which the equalizing body (5) exhibits a slot (53) serving as an elasticity slot for compressing the elastic section (52) down to an outer diameter (ds\*) smaller than or equal to the inner diameter (dgi) of the interior (32) of the inside oscillating body (3).

3. An inside oscillating body (3) according to claim 1 or 2, in which the equalizing body (5) exhibits a slot (52) for adjusting said equalizing body and exhibits an outer thread (51), and in which an inner wall belonging to the interior (32) exhibits an inner thread (33) employed in screwing in the equalizing body (5).

4. An inside oscillating body (3) according to a previous claim, with an access hole (6) to the equalizing body (5) for use in adjusting the equalizing body (5) from the front of the oscillating body (3).

5. An inside oscillating body (3) according to one of claims 1 to 3, with an access hole (6) to the equalizing body (5) for use in adjusting the equalizing body (5) from the back of the oscillating body (3).

6. An inside oscillating body according to claim 5, in which the access hole (6) runs through a drive and/or receiving device (7, 71).

7. An equalizing body (5) for an oscillating body (3) belonging to a level meter (1) according to a preceding claim, where the equalizing body (5) exhibits a section (52) that is at least partially elastic, such that the outer diameter (ds\*) of the elastic section (52) is larger than an inner diameter (dgi) of an interior (32) of the oscillating body (3) when the equalizing body (52) is in relaxed condition.

8. An equalizing body according to claim 7, with a slot (53) serving as an elasticity slot for compressing the elastic section (52) down to an outer diameter (ds\*) smaller than or equal to the inner diameter (dgi) of the interior (32) of the oscillating body (3).

9. A drive and/or receiving device (7), particularly for a level meter (1), with an inner oscillating body (3) according to one of claims 1 to 6, with
 a drive and/or receiving device (71) for producing or receiving the oscillations of at least one oscillating body (2, 3),
 an oscillation transmitting section (4) for transmitting an oscillation between one or more oscillating bodies (2, 3), on the one hand, and the drive and/or receiving device (71), on the other hand, such that the drive and/or receiving device (71), the oscillating transmitting section (6), and the one or more oscillating bodies (2, 3) run along a longitudinal axis (X) of the device in operating condition,
 wherein
 there is an access hole (6) that runs in a direction along, or parallel to, the longitudinal axis (X) of the device, through the drive and/or receiving device, particularly through the drive and/or receiving device (71), and through the oscillation transmitting section (4), to provide access to the one or more oscillating bodies (3).

10. A drive and/or receiving device according to claim 9, in which the access hole (6) serves as access hole to an equalizing body (5), such that the equalizing body (5) is adjustably positioned inside the one or more oscillating bodies (3) in order to equalize the oscillation behavior of the apparatus.

11. A drive and/or receiving device according to claim 9 or 10, in which the drive and/or receiving device (7) is symmetrically designed around the access hole (6).

12. A drive and/or receiving device (7) according to one of claims 9 to 11, in which the access hole (6) takes the form of a cylindrical borehole.

13. A drive and/or receiving device (7) according to one of claims 9 to 12, with a fastening device (8) for fastening the drive and/or receiving device (7) in the area beside the drive and/or receiving device (71) to a fastening element (4) of the one or more oscillating bodies (2, 3).

14. A level meter (1) with two oscillating bodies (2, 3), one positioned inside the other, particularly in accordance to one of claims 1 to 6, which can be set into vibration in relation to each other, a drive and/or receiving device (71), particularly according to one of claims 9 to 13, for exciting at least one of the oscillating bodies (2, 3) or for detecting an oscillation from at least one of the oscillating bodies (2, 3), and a fastening device (4) for fastening the oscillating bodies (2, 3) to the drive and/or receiving device (71), such that the outside oscillating body (2) is secured to the fastening device (4) by a connecting section (22, 23) that, at least in part, has an elastic effect, wherein the fastening device (4) exhibits a through-hole (4\*) for guiding a connecting element (81), and the drive and/or receiving device (71) is braced against the fastening device (4) by this connecting element at the back, and particularly is braced against the connecting segment (22, 23).

15. A level meter according to claim 14, in which the connecting element (81) is guided without friction through the through-hole (4\*) of the fastening device (4) in such a way that oscillations in the back section of the drive and/or receiving device (71) are transmitted by the connecting element (81) of the fastening device (8) to the connecting section (22, 23) and/or to the outside oscillating body (2).

* * * * *

UNITED STATES PATENT AND TRADEMARK OFFICE
CERTIFICATE OF CORRECTION

PATENT NO. : 7,131,326 B2
APPLICATION NO. : 11/033863
DATED : November 7, 2006
INVENTOR(S) : Ohmayer Page 1 of 1

It is certified that error appears in the above-identified patent and that said Letters Patent is hereby corrected as shown below:

Column 8, Lines 4 to 5,
Please delete "a previous claim" and replace with -- claim 1 --

Column 8, Lines 17 to 18,
Please delete "a preceding claim" and replace with -- claim 1 --

Column 8, Line 30,
Please delete "one of claims 1 to 6" and replace with -- claim 1 --

Column 8, Lines 60 to 61,
Please delete "one of claims 9 to 11" and replace with -- claim 9 --

Column 8, Lines 63 to 64,
Please delete "one of claims 9 to 12" and replace with -- claim 9 --

Column 9, Lines 3 to 4,
Please delete "one of claims 1 to 6" and replace with -- claim 1 --

Signed and Sealed this

Thirtieth Day of January, 2007

JON W. DUDAS
*Director of the United States Patent and Trademark Office*